A. J. P. BERTSCHY.
SUSPENSION FOR VEHICLES.
APPLICATION FILED APR. 6, 1912.
1,071,547.
Patented Aug. 26, 1913.
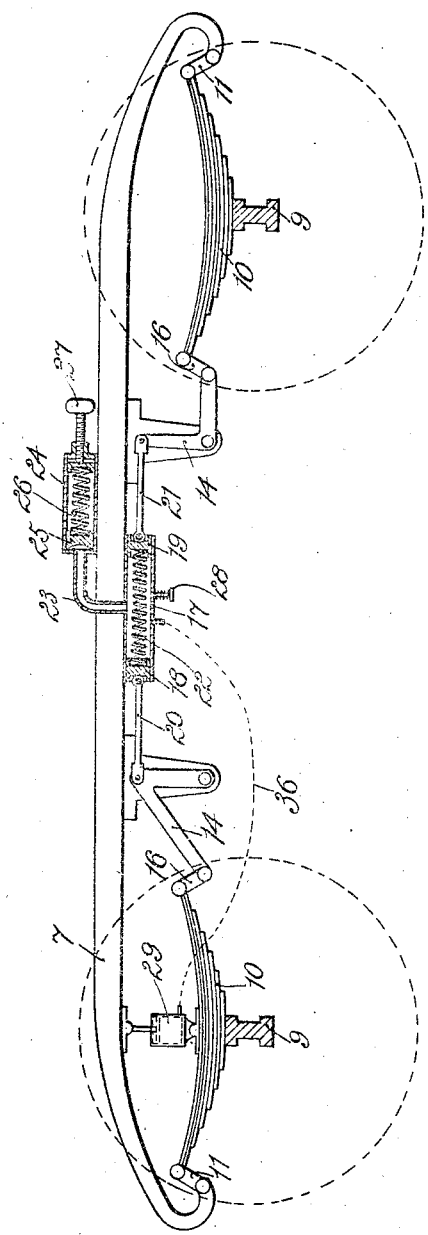
Witnesses:
Robert F. Bracke
Leonard W. Novander
Inventor
Adolph J. P. Bertschy
By Brown
Attorneys

UNITED STATES PATENT OFFICE.

ADOLPH J. P. BERTSCHY, OF COUNCIL BLUFFS, IOWA.

SUSPENSION FOR VEHICLES.

1,071,547.

Specification of Letters Patent. Patented Aug. 26, 1913.

Application filed April 6, 1912. Serial No. 688,880.

*To all whom it may concern:*

Be it known that I, ADOLPH J. P. BERTSCHY, a citizen of the United States, residing at Council Bluffs, in the county of Pottawattamie and State of Iowa, have invented a certain new and useful Improvement in Suspensions for Vehicles, of which the following is a full, clear, concise, and exact description, reference being had to the accompanying drawings, forming a part of this specification.

My invention relates to suspensions for vehicles and is particularly concerned with shock absorbing mechanism. Simply stated, my invention provides a system for increasing the relative vertical movement between the body of a vehicle and the axles thereof, and its object is to secure this result in a simple and efficient manner.

The improved features of my invention are illustrated in the accompanying drawing, which is a side elevational view of the arrangement.

A cylinder 17 as shown in the drawing is secured to the frame 7 and is provided with a forward piston 18 and a rear piston 19. The forward piston 18 is connected to the forward bell crank lever 14 through the medium of a connecting rod 20 and the rear piston 19 is connected to the rear bell crank lever 14 through the medium of a connecting rod 21. A coil spring 22 is disposed in the cylinder 17 between the two pistons. It will be seen that the action of either spring 10 will vary the tension of the spring 22 and consequently vary the effect of the spring 22 by the other spring 10, and in this way the two axle springs are inter-dependent. It will be noted that the spring 22 is assisted in its action by the air cushion which is formed between the two pistons and in order to make this adjustable I provide a middle outlet 23 which leads to an auxiliary cylinder 24 having a piston 25 therein, this piston being backed by a spring 26 which is made adjustable by a screw 27. This auxiliary cylinder acts as the adjustable part of the air cushion which is formed. An atmosphere inlet is controlled by the puppet valve 28 and it is evident that this valve will be called upon only when a vacuum is produced. I contemplate that this apparatus may be used just as described with atmospheric pressure but in case greater pressure is desired, it is possible to employ a pump 29 between the frame 7 and the axle 9, this pump being thus operated by the vibrations of the body and being adapted, through a pipe 36 to feed the air cushion between the pistons. It will be understood that this is a very effective arrangement since the more the vibrations the greater will be the pressure produced in the cushion by the action of the pump.

I claim as new and desire to secure by Letters Patent:

1. In a suspension for vehicles, a pair of axles, a spring mounted on each axle, a frame connected at one end to an end of one spring and at the other end to an end of the other spring, levers connected with the free ends of said springs, a cylinder, and a piston in said cylinder connected to each lever.

2. In a suspension for vehicles, a pair of axles, a spring mounted on each axle, a frame connected at one end to an end of one spring and at the other end to an end of the other spring, levers connected with the free ends of said springs, a cylinder, a piston in said cylinder connected to each lever, and an adjustable reservoir communicating with said cylinder.

3. In a suspension for vehicles, a pair of axles, a spring mounted on each axle, a frame connected at one end to an end of one spring and at the other end to an end of the other spring, levers connected with the free ends of said springs, a cylinder, a piston in said cylinder connected to each lever, an adjustable reservoir communicating with said cylinder, and a spring between said pistons.

4. In a suspension for vehicles, a pair of axles, a spring mounted on each axle, a frame connected at one end to an end of one spring and at the other end to an end of the other spring, levers connected with the free ends of said springs, a cylinder, a piston in said cylinder connected to each lever, an adjustable reservoir communicating with said cylinder, a spring between said pistons, and means for increasing the pressure in said cylinder.

5. In a suspension for vehicles, a pair of axles, a spring mounted on each axle, a frame connected at one end to an end of one spring and at the other end to an end of the other spring, levers connected with the free ends of said springs, a cylinder, a piston in said cylinder connected to each lever, an adjustable reservoir communicating with said cylinder, a spring between said pistons, and mechanism disposed between the frame and one of the springs for increasing the pressure in said cylinder depending upon the amount of vibration.

6. In a suspension for vehicles, a pair of axles, a spring mounted on each axle, a frame connected at one end to an end of one spring and at the other end to an end of the other spring, levers connected with the free ends of said springs, a cylinder, a piston in said cylinder connected to each lever, an adjustable reservoir communicating with said cylinder, a spring between said pistons, and a pump disposed between one axle and the frame for creating a difference of pressure in said cylinder in accordance with the amount of vibration.

In witness whereof, I hereunto subscribe my name this 2nd day of April, A. D., 1912.

ADOLPH J. P. BERTSCHY.

Witnesses:
C. H. GRAHAM,
R. R. OVER.